United States Patent
Mincarelli et al.

(10) Patent No.: US 7,587,718 B1
(45) Date of Patent: Sep. 8, 2009

(54) METHOD AND APPARATUS FOR ENFORCING A RESOURCE-USAGE POLICY IN A COMPUTE FARM

(75) Inventors: John R. Mincarelli, Weare, NH (US); Sriram Sitaraman, Sunnyvale, CA (US)

(73) Assignee: Synopsys, Inc., Mountain View, CA (US)

(*) Notice: Subject to any disclaimer, the term of this patent is extended or adjusted under 35 U.S.C. 154(b) by 0 days.

(21) Appl. No.: 12/262,604

(22) Filed: Oct. 31, 2008

(51) Int. Cl.
*G06F 9/455* (2006.01)
*G06F 9/46* (2006.01)
*G06F 15/173* (2006.01)
*G06F 11/00* (2006.01)

(52) U.S. Cl. .......................... 718/100; 718/1; 718/105; 718/104; 709/226; 709/224; 709/225; 714/2; 714/47

(58) Field of Classification Search ................. 718/1, 718/100, 101, 102, 103, 104, 105; 709/223, 709/224, 225, 226; 714/2, 25, 1, 37, 47, 714/51
See application file for complete search history.

(56) References Cited

U.S. PATENT DOCUMENTS

| | | | |
|---|---|---|---|
| 7,370,195 B2 * | 5/2008 | Parham et al. .............. 713/155 |
| 7,406,694 B2 | 7/2008 | Sen | |
| 2004/0111725 A1 * | 6/2004 | Srinivasan et al. .......... 718/105 |
| 2004/0154016 A1 * | 8/2004 | Randall ......................... 718/1 |
| 2005/0166095 A1 | 7/2005 | Chander et al. | |
| 2005/0235054 A1 * | 10/2005 | Kadashevich ............... 709/223 |
| 2005/0235284 A1 * | 10/2005 | Kadashevich ............... 718/100 |
| 2005/0251804 A1 * | 11/2005 | Musta et al. ................ 718/100 |
| 2006/0235964 A1 * | 10/2006 | Childress et al. ........... 709/224 |
| 2008/0115143 A1 * | 5/2008 | Shimizu et al. ............. 718/105 |
| 2008/0228874 A1 * | 9/2008 | Fu et al. ..................... 709/203 |

* cited by examiner

*Primary Examiner*—Meng-Al T. An
*Assistant Examiner*—Abdullah Al Kawsar
(74) *Attorney, Agent, or Firm*—Park, Vaughan & Fleming LLP

(57) ABSTRACT

One embodiment of the present invention provides a system that enforces a resource-usage policy in a compute farm. During operation, the system can receive etiquette rules which include resource-usage rules and corrective-action rules. Resource-usage rules can specify situations in which the resource-usage policy is violated, and corrective-action rules can specify situations in which a corrective action needs to be performed. Next, the system can receive resource-usage information which includes job monitoring data and process monitoring data. The system can then determine a resource-usage violation by applying the resource-usage rules to the resource-usage information. Next, the system can store the resource-usage violation in a violation database. The system can then determine a corrective action by applying corrective-action rules to a series of violations stored in the violation database. Next, the system can perform the corrective action, thereby enforcing the resource-usage policy in the compute farm.

12 Claims, 9 Drawing Sheets

|  | BATCH JOB POLICY (IDLE JOBS) | BATCH JOB POLICY (LONG JOBS) |
|---|---|---|
| THRESHOLDS | LESS THAN 10% PROCESSOR TIME FOR MORE THAN 3 HOURS | GREATER THAN 120 HOURS OF RUNTIME |
| DATA COLLECTION FREQUENCY | HOURLY | DAILY |
| NOTIFICATION FREQUENCY | HOURLY | DAILY |
| EMAIL RECIPIENTS | INDIVIDUAL USERS AND ADMINISTRATORS | INDIVIDUAL USERS AND ADMINISTRATORS |
| USER EXCEPTIONS | NONE | JDOE |
| PROCESS EXCEPTIONS | I/O PROCESS | BIG APPLICATION |
| HOST EXCEPTIONS | NONE | NONE |
| PROCESS/JOB TERMINATION | AFTER 3 NOTIFICATIONS | AFTER 2 NOTIFICATIONS |

FIG. 3B

| | INTERACTIVE JOB POLICY |
|---|---|
| THRESHOLDS | LESS THAN 5% PROCESSOR TIME FOR MORE THAN 6 HOURS |
| DATA COLLECTION FREQUENCY | HOURLY |
| NOTIFICATION FREQUENCY | HOURLY |
| EMAIL RECIPIENTS | ALL USERS AND ADMINISTRATORS |
| USER EXCEPTIONS | NONE |
| PROCESS EXCEPTIONS | NONE |
| HOST EXCEPTIONS | NONE |
| PROCESS/JOB TERMINATION | NEVER |

FIG. 3C

|  | PROCESSOR/MEMORY USAGE POLICY | DIRECT LOGIN POLICY |
|---|---|---|
| THRESHOLDS | GREATER THAN 20% PROCESSOR TIME OR 500 MB MEMORY | DIRECT LOGIN ON A COMPUTER SYSTEM IN A COMPUTE FARM |
| DATA COLLECTION FREQUENCY | 10 MINUTES | 20 MINUTES |
| NOTIFICATION FREQUENCY | 30 MINUTES | 20 MINUTES |
| EMAIL RECIPIENTS | INDIVIDUAL USERS AND ADMINISTRATORS | INDIVIDUAL USERS AND ADMINISTRATORS |
| USER EXCEPTIONS | ROOT | ROOT, NOBODY, BIN |
| PROCESS EXCEPTIONS | NONE | A USER WHO HAS A JOB THAT IS EXECUTING ON THE COMPUTER SYSTEM |
| HOST EXCEPTIONS | HOST-A | TERMINAL-SERVER-A |
| PROCESS/JOB TERMINATION | AFTER 4 NOTIFICATIONS | IMMEDIATELY UPON DETECTION |

FIG. 3D

METHOD AND APPARATUS FOR ENFORCING A RESOURCE-USAGE POLICY IN A COMPUTE FARM

FIELD OF THE INVENTION

The present invention generally relates to distributed computing. More specifically, the present invention relates to methods and apparatuses for ensuring that the resources of a compute farm are used in a desired fashion.

BACKGROUND

Related Art

The availability of cheap hardware has given rise to distributed computing systems called compute farms in which a large number of computer systems, e.g., servers, are coupled together using a high-speed network. Enterprises are using compute farms for performing compute-intensive tasks, such as computer-aided design, graphics rendering, software compilation, electronic design automation, and database query processing.

The resources in a compute farm are usually managed using a queuing system. Typically, the compute farm's resources are represented as a collection of job slots, where each job slot represents a specific amount of resources in the compute farm. The queuing system then schedules jobs submitted by users in these job slots. The system typically uses different types of jobs slots to accommodate different types of applications. For example, the system may have interactive job slots and batch jobs slots, which are intended to execute lightweight interactive jobs and compute-intensive batch jobs, respectively.

Conventional techniques typically depend on the user to indicate the type of job when the user submits the job to the queuing system. Unfortunately, if a user incorrectly categorizes a job, the queuing system may schedule the job in the wrong type of job slot, which can waste resources and/or cause performance problems. Further, some users may try to bypass the queuing system by attempting to directly execute jobs on the compute farm nodes, which can also cause performance problems.

Hence, there is a strong need to find systems and techniques to ensure that resources in a compute farm are used properly.

SUMMARY

One embodiment of the present invention provides a system that enforces a resource-usage policy in a compute farm. The compute farm's resources can be represented as a collection of different types of job slots which are intended to be allocated to different types of jobs. For example, the job slots can be categorized into light interactive job slots, heavy interactive job slots, batch job slots, overflow job slots, etc. The system can use a queuing system to manage the set of job slots.

During operation, the system can receive etiquette rules which include resource-usage rules and corrective-action rules. Resource-usage rules can specify situations in which the resource-usage policy is violated, and corrective-action rules can specify situations in which a corrective action needs to be performed. Next, the system can receive resource-usage information which includes job monitoring data and process monitoring data. Job monitoring data can describe resource usage of monitored jobs, and process monitoring data can describe resource usage of monitored processes.

The system can then determine a resource-usage violation by applying the resource-usage rules to the resource-usage information. Next, the system can store the resource-usage violation in a violation database. The system can then determine a corrective action by applying corrective-action rules to a series of violations stored in the violation database. Next, the system can perform the corrective action, thereby enforcing the resource-usage policy in the compute farm.

For each monitored job, the job monitoring data can specify how long the monitored job has been executing, and how long the monitored job has been idle. Further, for each monitored process, the process monitoring data can specify the amount of processor time that the monitored process used, and the amount of memory that the monitored process used. The process monitoring data can also indicate whether a user performed a direct login on a compute farm node, and the processes that the user spawned during the login session.

A corrective action can generally be any action that is designed to correct the resource-usage policy violation. Specifically, the system can send a notification to a user who caused the series of violations which triggered the corrective action. Further, the system can send a notification to the user's manager and/or to a system administrator. Additionally, the system can terminate the offending job or the offending process which caused the series of violations which triggered the corrective action.

BRIEF DESCRIPTION OF THE FIGURES

FIGS. 3B-3D illustrate an exemplary resource-usage policy in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Compute Farm Availability of cheap hardware has given rise to distributed computing architectures in which a set of computer systems are coupled together using a high-speed network. These distributed architectures are sometimes called compute farms, and are being used for a variety of applications, many of which require large amounts of computing resources. For example, compute farms have been used for computer-aided design, graphics rendering, electronic design automation, software compilation, database query processing, etc.

Figure 1:
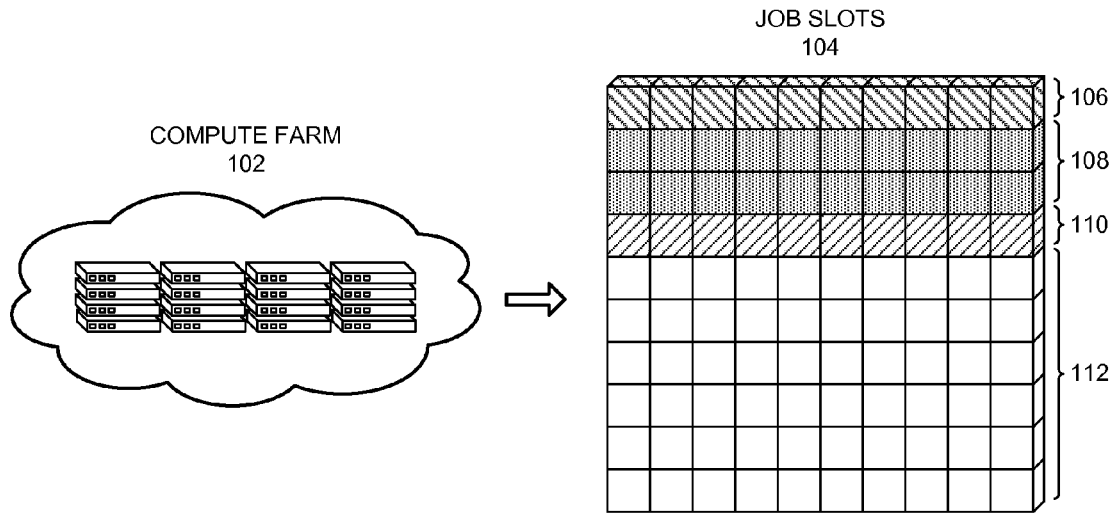
FIG. 1 illustrates a compute farm in accordance with an embodiment of the present invention.

FIG. 1 illustrates a compute farm in accordance with an embodiment of the present invention.

Compute farm 102 includes a large number of computers which are coupled together using a network. The computers that make up the compute farm can be located within a single building, e.g., a data center, or they can be spread out across the world.

What usually distinguishes a compute farm from a generic computer network is that a compute farm typically includes software which enables users to execute jobs on the compute farm as a whole. In other words, the software hides the details of the compute farm architecture from the user. The software provides an abstraction of the resources in a compute farm which makes the compute farm more user friendly, and it also makes the compute farm much easier to manage and maintain. For example, to execute a job on the compute farm, the user does not have to know the network addresses of the computers or the loads of the different computers. Instead, the user simply provides the job to the software that manages the compute farm, and the software then determines how and when to execute the job.

In one embodiment, the software enables users to view the compute farm as a collection of job slots. A job slot is a generalized resource unit which can be used to execute a job. For example, a job slot can represent a dedicated processor with a specific amount of memory, or it can represent only a percentage of a processor's time with no memory guarantees. Further, job slots can be of different types, e.g., some job slots may be reserved for highly interactive jobs, whereas other job slots may be reserved for compute-intensive jobs.

For example, compute farm 102 can be viewed as a collection of job slots 104. Job slots 104 may be divided into different categories based on the different types of jobs. For example, job slots 104 can include light interactive job slots 106, heavy interactive job slots 108, overflow job slots 110, and batch job slots 112. Light interactive job slots 106 can be used to execute jobs which require user interaction and which are not expected to be computationally intensive. Heavy interactive job slots 108 can be used to execute jobs which require user interaction and which are expected to be computationally intensive. Overflow job slots 110 can be used to execute "overflow" jobs, i.e., jobs for which the system was unable to find an unused job slot. Batch job slots 112 can be used to execute compute-intensive jobs which do not require user interaction. Batch job slots 112 can also be used to execute high priority jobs which require dedicated resources.

Different types of job slots may represent different amounts of resources. For example, since light interactive jobs are not expected to be computationally intensive, each light interactive job slot may represent a small amount of processor and memory resources. Stated differently, a single computer in the compute farm can accommodate a large number of light interactive job slots. In contrast, a batch slot can represent a large amount of processor and memory resources, e.g., a dedicated computer system.

Figure 2:
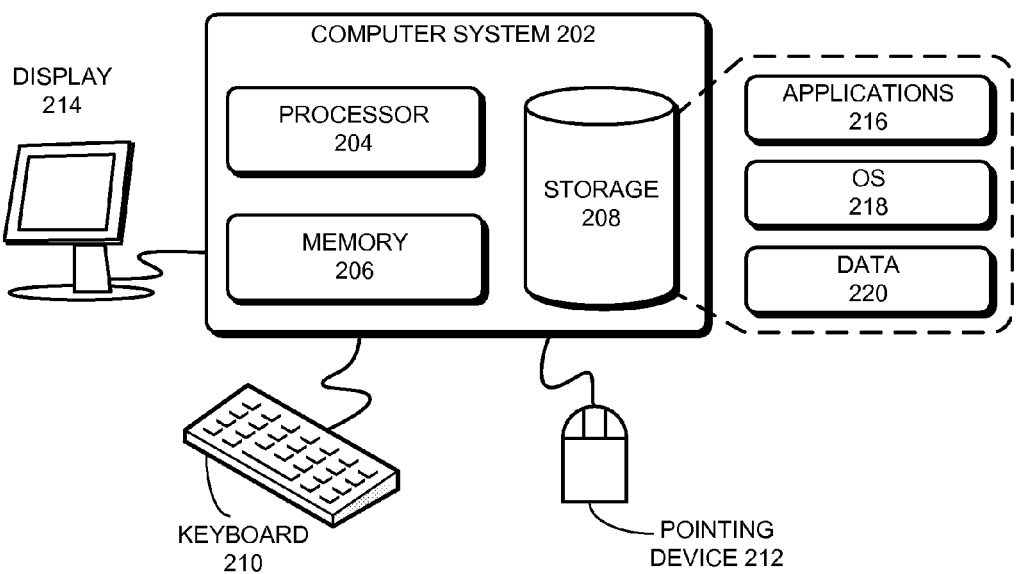
FIG. 2 illustrates a computer system in accordance with an embodiment of the present invention.

FIG. 2 illustrates a computer system in accordance with an embodiment of the present invention.

Computer system 202 comprises processor 204, memory 206, and storage 208. Computer system 202 can be coupled with display 214, keyboard 210, and pointing device 212. Storage 208 can store applications 216, operating system 218, and data 220. Note that, during normal operation, a computer system in a compute farm is usually not coupled with input/output devices such as display 214, keyboard 210, and pointing device 212. However, the computer system may be coupled with input/output devices for maintenance purposes.

Each computer system in a compute farm is usually a "stand alone" computer system, i.e., each computer system has its own operating system, and it executes jobs by loading jobs in its memory and executing the associated instructions on its processor. A compute farm typically cannot move a job that is executing on one computer system to another computer system without losing state. In other words, moving a job from a first computer system to a second computer system in a compute farm usually involves stopping the job on the first computer system and restarting the job from scratch on the second computer system. In this respect, a compute farm may be different from a distributed system which appears as a single computer system to the end user and which supports seamless migration of jobs from one computing node to another.

The foregoing descriptions of a computer system and a compute farm have been presented only for purposes of illustration and description. They are not intended to be exhaustive or to limit the present invention to the forms disclosed. A computer system in a compute farm can generally be any system that is capable of processing data and that is capable of communicating with other computer systems. Specifically, a computer system can be based on a multiprocessor and/or a processor with multiple cores.

Resource-Usage Policy

To efficiently utilize the resources of a compute farm, the system typically has to ensure that each type of job slot is being used properly. For example, a batch job slot is designed to execute compute-intensive jobs. Hence, resources will be wasted if the system schedules an interactive job in a batch job slot. Conversely, if the system schedules a compute-intensive job on a computer system which is intended to execute interactive jobs, it may cause serious performance problems.

Even though the queuing system is supposed to efficiently manage the resources of a compute farm, the resource usage may not be as efficient as it can be. Specifically, the queuing system typically depends on the users to properly categorize the jobs so that the queuing system knows how to schedule them. Hence, a user may mistakenly or on purpose cause the system to schedule a job in the wrong type of job slot. Further, some users may try to completely bypass the queuing system by directly logging in to computer systems in the compute farm. For these reasons, systems and techniques are required to detect jobs and processes in the compute farm which are misusing the compute farm's resources, and to correct the misuse by sending notifications to the appropriate users and/or by terminating the offending jobs or processes.

A resource-usage policy specifies the situations in which a job, a process, and/or a user are not using the resources in a desired fashion. Further, a resource-usage policy specifies when a corrective action needs to be taken, and, if so, what kind of corrective action should be taken.

Figure 3A:
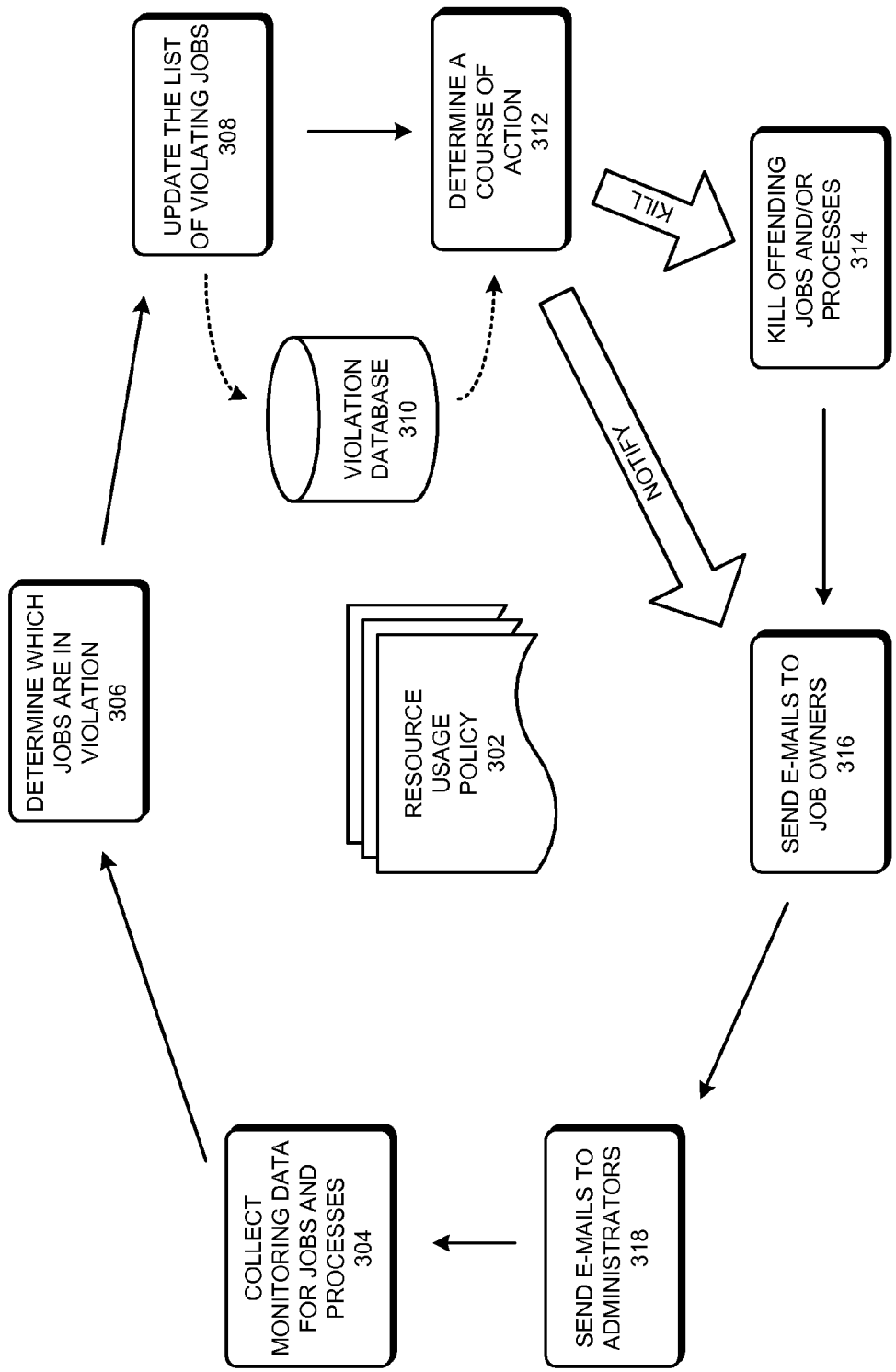
FIG. 3A illustrates a methodology for using a resource-usage policy in accordance with an embodiment of the present invention.

FIG. 3A illustrates a methodology for using a resource-usage policy in accordance with an embodiment of the present invention.

Resource-usage policy 302 can specify how the resources of a compute farm are to be used. Specifically, resource-usage policy 302 can specify etiquette rules which specify situations where a job, a process, or a user are not using the compute farm's resources in a way that conforms to the enterprise's usage policy.

Enforcing the resource-usage policy can require various processes or steps to be performed by one or more computer systems. Specifically, the system may collect monitoring data for jobs and processes (step 304). Next, the system may determine which jobs are in violation (step 306). The system may then update the list of violating jobs (step 308). Specifically, the system may store the violations in violation database 310. Next, the system may determine a course of action (step 312). For example, the course of action can include killing offending jobs and/or processes (step 314). Alternatively, the course of action can include sending emails to job owners (step 316). The system may also send emails to administrators (step 318).

FIGS. 3B-3D illustrate an exemplary resource-usage policy in accordance with an embodiment of the present invention. Specifically, FIG. 3B illustrates a resource-usage policy for batch jobs, FIG. 3C illustrates a resource-usage policy for interactive jobs, and FIG. 3D illustrates a resource-usage policy for processor/memory usage and direct logins.

In FIGS. 3B-3D, each row corresponds to a configurable parameter in the resource-usage policy, and each column corresponds to the resource-usage policy for a specific type of job. The "data collection frequency" row specifies how often the job monitoring data is collected, and the "thresholds" row specifies the situations that cause a policy violation. For example, in FIG. 3B, a batch job is considered to be an idle job (which is a violation of the batch job policy) if it consumes less than 10% of the processor time for more than 3 hours.

Once the system determines that a job or a process is violating a policy, the system can take a corrective action. For example, in FIG. 3B, if the system determines that the batch job is an idle job, the system can send notification emails to email recipients shown in the "email recipients" row with a notification frequency that is specified in the "notification frequency" row. If the policy violation continues for a long time, the system may take other corrective actions, such as terminating the job or process. For example, in FIG. 3B, the "process/job termination" row specifies that if the violation has not stopped after sending three notifications to the user, the system should terminate the offending job or process.

The resource-usage policy may exempt users ("user exceptions" row), processes ("process exceptions" row), or hosts ("host exceptions" row) from conforming to the policy. For example, in FIG. 3B, a process called "I/O process" is exempt from the idle job policy because this process may be expected to perform a large number of input/output operations, and hence, it may be expected to be idle for long periods of time while it waits for the input/output device to perform the operation. Hence, even if the system determines that the "I/O process" has violated the idle job policy, the system may not perform any corrective actions. Alternatively, the system may decide to not collect process monitoring data for "I/O process," thereby exempting the process.

The foregoing descriptions of resource-usage policies have been presented only for purposes of illustration and description. They are not intended to be exhaustive or to limit the present invention to the forms disclosed.

Process for Enforcing a Resource-Usage Policy

Figure 4:
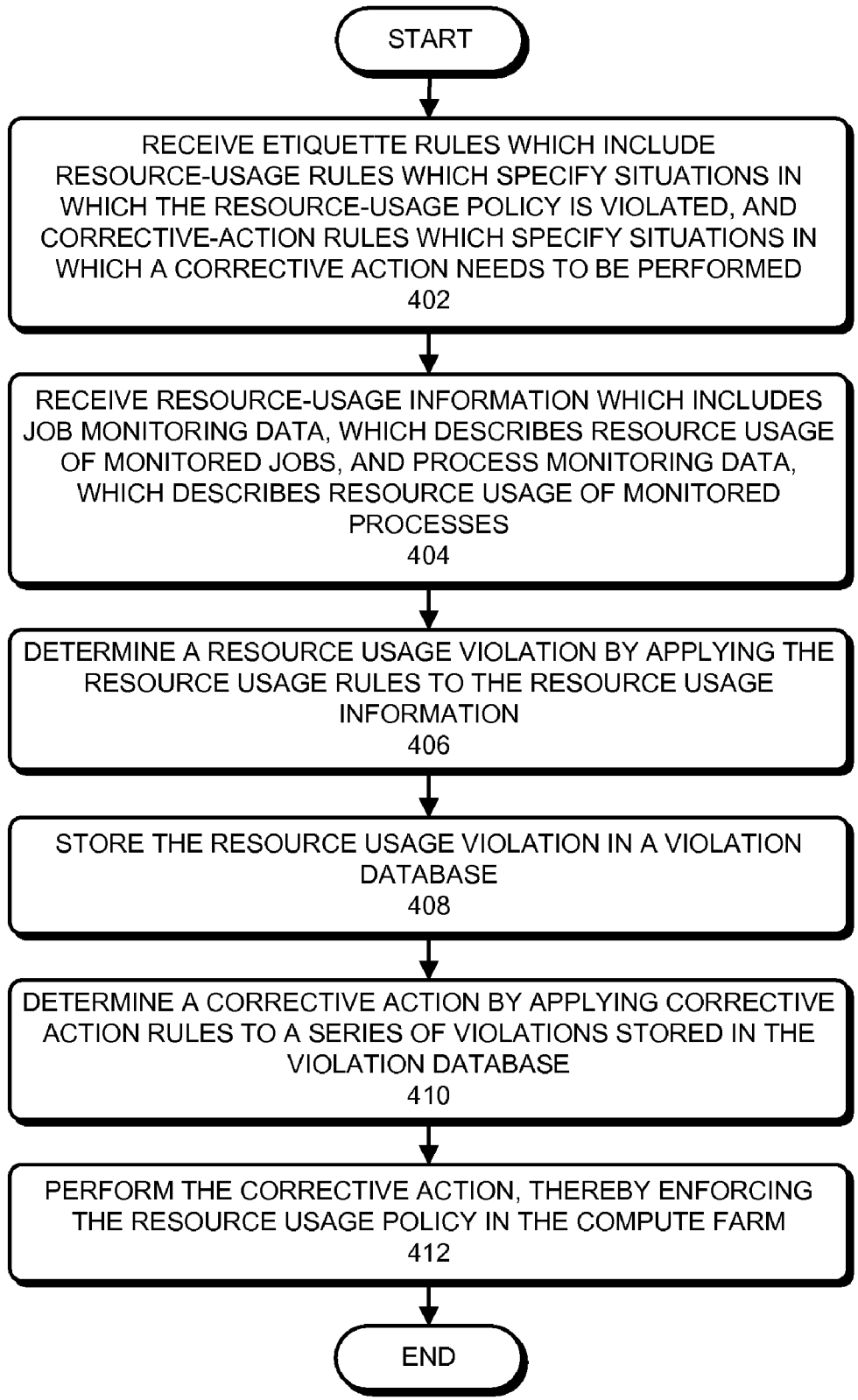
FIG. 4 presents a flowchart that illustrates a process for enforcing a resource-usage policy in accordance with an embodiment of the present invention.

FIG. 4 presents a flowchart that illustrates a process for enforcing a resource-usage policy in accordance with an embodiment of the present invention.

The process can begin by receiving etiquette rules which include resource-usage rules which specify situations in which the resource-usage policy is violated, and corrective-action rules which specify situations in which a corrective action needs to be performed (step 402).

Note that, each job or process typically uses various resources, such as processor time, memory, etc. A resource-usage rule can specify the resource-usage patterns that are considered to be violations. Alternatively, a resource-usage rule can specify the resource-usage patterns that are considered to be conforming.

For example, a resource-usage rule may specify that a process that is executing on a computer system that is associated with an interactive job slot cannot use more than a certain percentage of processor time. Another resource-usage rule may specify that every job's memory usage must be less than a certain amount. A resource-usage rule can also impose limits on multiple resources at the same time. For example, a resource-usage rule may specify that if a process uses less than 20% of processor time, it can use up to 2 GB of memory, but if the process uses less than 10% of processor time, it can use up to 4 GB of memory. These examples of resource-usage rules have only been provided for illustration and are not intended to limit the present invention to the forms disclosed.

Next, the system can receive resource-usage information which includes job monitoring data, which describes resource usage of monitored jobs, and process monitoring data, and which describes resource usage of monitored processes (step 404).

Specifically, for each monitored job, the job monitoring data can specify how long the monitored job has been executing, and how long the monitored job has been idle. Further, for each monitored process, the process monitoring data can include an amount of processor time that the monitored process used, and an amount of memory that the monitored process used. The process monitoring data can also indicate whether a monitored process on a computer system in the compute farm is associated with a direct login by a user on the computer system.

If the computer system is executing the UNIX operating system, the system can schedule a "cron" job that collects the job monitoring data and the process monitoring data at regular intervals. Note that a job is typically associated with a high level task, and hence, the job can be associated with multiple processes. For example, performing optical proximity correction (OPC) on a layout can be a task. To perform this task, the system may schedule an "OPC job" which may involve spawning multiple processes and/or threads. When a process spawns another process, the operating system may store their parent-child relationship. Hence, the system may first determine the resource usage of various processes on a computer system, and then use the parent-child relationship information to determine the resource usage of a job.

The system can then determine a resource-usage violation by applying the resource-usage rules to the resource-usage information (step 406).

Next, the system can store the resource-usage violation in a violation database (step 408). For example, if the process monitoring data indicates that a particular process is using more processor time than what was allocated to the process, the system can create a violation which includes the process identifier and the resource-usage rule that the process violated. Next, the system can store the violation in the violation database.

The system can then determine a corrective action by applying corrective-action rules to a series of violations stored in the violation database (step 410).

Applying corrective-action rules to a series of violations enables the system to better select a corrective action. Specifically, the violation database can keep track of the violations that a particular job or process has committed in the past, which can enable the system to define complex corrective-action rules based on the "state" of the violation.

For example, if the system detects that a batch job is idle, the system may increment an "idle job violation" counter for the batch job. The resource-usage policy may specify that a corrective action should be taken if the "idle job violation" counter is greater than or equal to three. However, the resource-usage policy may also specify that if the batch job starts using resources (i.e., it is no longer idle), the counter should be reset to zero. Hence, under this resource-usage policy, if the batch job is idle for two consecutive data collection periods, and then starts using resources during the third data collection period, the counter will be equal to zero after the third data collection period.

A corrective action can generally be any action that is designed to correct resource-usage violations. Exemplary corrective actions include sending a notification to a user who caused the series of violations which triggered the corrective action, sending a notification to the user's manager, and sending a notification to a system administrator of the compute farm. If sending notifications is not expected to correct the violation, the system can terminate an offending job or an offending process which caused the series of violations which triggered the corrective action. If the system terminates a job, the system can notify a user that his or her job was terminated and provide a reason as to why the job was terminated.

Next, the system can perform the corrective action, thereby enforcing the resource-usage policy in the compute farm (step 412). In some embodiments, the system is mindful of its users' schedule. Specifically, the system can defer performing a corrective action to give a user or an administrator a chance to correct the problem. For example, it would be unfair to a user if the system terminated a process because the user did not act on a warning email that was sent to the user during a holiday or over the weekend. Hence, some embodiments of the present invention do not perform corrective actions during holidays and weekends so that the user has a chance to correct the problem. In other words, some embodiments delay the performance of the corrective action so that it is performed on a working day.

Figure 5:
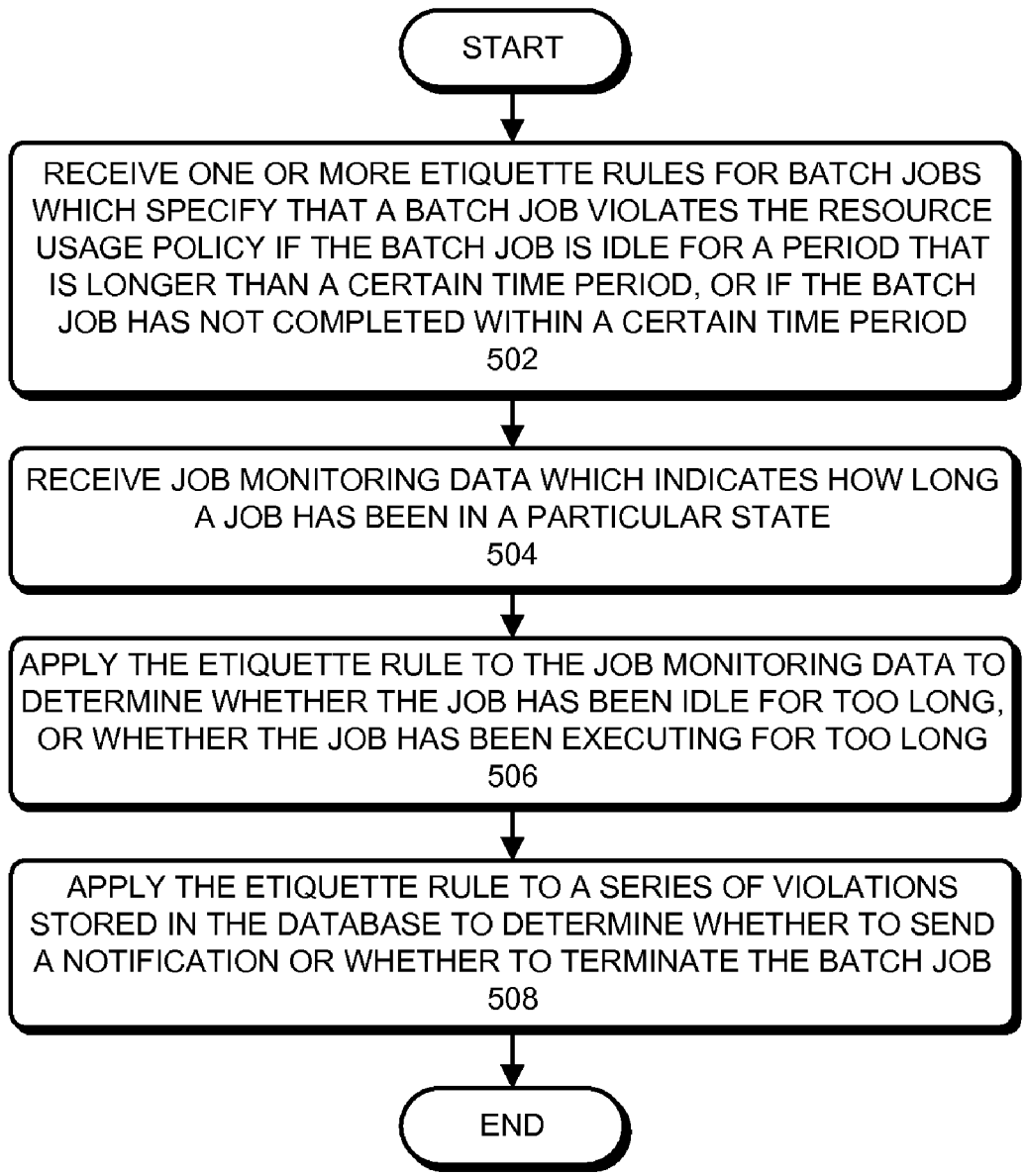
FIG. 5 presents a flowchart that illustrates a process for applying etiquette rules to batch jobs in accordance with an embodiment of the present invention.

FIG. 5 presents a flowchart that illustrates a process for applying etiquette rules to batch jobs in accordance with an embodiment of the present invention.

The process can begin by receiving one or more etiquette rules for batch jobs which specify that a batch job violates the resource-usage policy if the batch job is idle for a period that is longer than a certain time period, or if the batch job has not completed within a certain time period (step 502).

Next, the system can receive job monitoring data which indicates how long a job has been in a particular state (step 504). Specifically, the job monitoring data can indicate how long the job has been idle and/or how long the job has been executing.

The system can then apply the etiquette rule to the job monitoring data to determine whether the job has been idle for too long, or whether the job has been executing for too long (step 506). If the job has been executing for too long or if the job has been idle for too long, the system can generate a violation, and store the violation in a violation database.

Next, the system can apply the etiquette rule to a series of violations stored in the violation database to determine whether to send a notification or whether to terminate the batch job (step 508).

Specifically, the system can keep track of the number of violations that a particular batch job has committed, and perform different corrective actions based on the number of violations. By storing the violations in a database, the system can determine a corrective action based on the history of violations, and not just based on the latest violation. For example, the system may send a notification each time a batch job violates a resource-usage rule. However, if a job violates a rule more than a specified number of times, the system can terminate the job or escalate the issue by sending an email to the job owner's manager or to the system administrator.

Figure 6:
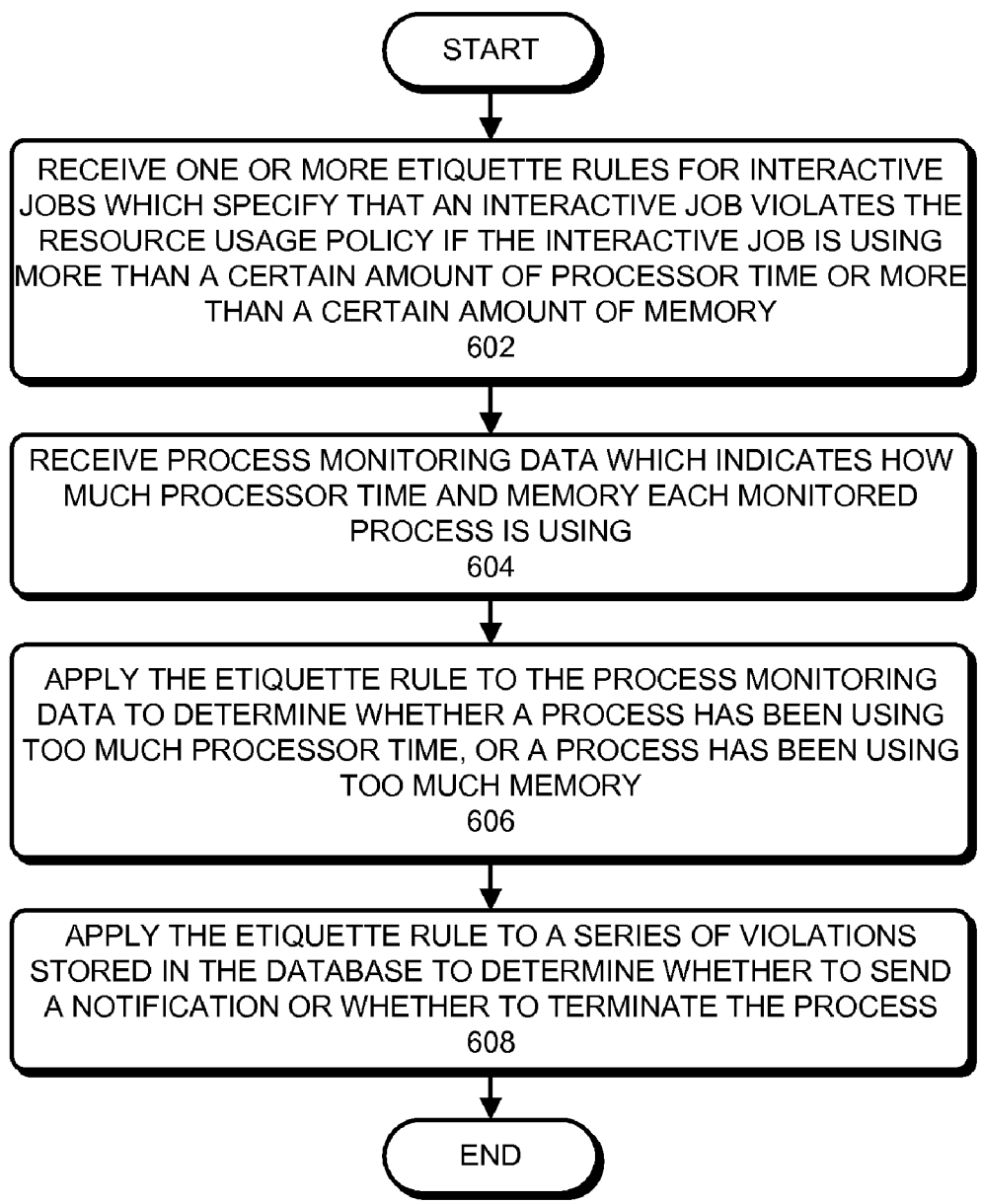
FIG. 6 presents a flowchart that illustrates a process for applying etiquette rules to interactive jobs in accordance with an embodiment of the present invention.

FIG. 6 presents a flowchart that illustrates a process for applying etiquette rules to interactive jobs in accordance with an embodiment of the present invention.

The process can begin by receiving one or more etiquette rules for interactive jobs which specify that an interactive job violates the resource-usage policy if the interactive job is using more than a certain amount of processor time or more than a certain amount of memory (step 602).

Next, the system can receive process monitoring data which indicates how much processor time and memory each monitored process is using (step 604). Note that the system may not monitor all the processes. For example, processes that are owned by "root" may not be monitored because they are essential for the proper operation of the system. For example, the system may not care how many resources the automounter process consumes as long as the process is operating properly. Hence, the system may not monitor such processes for determining resource-usage policy violations.

The system can then apply the etiquette rule to the process monitoring data to determine whether a process has been using too much processor time, or whether a process has been using too much memory (step 606). If a process has been using too much processor time or memory, the system can generate a violation, and store the violation in a violation database.

Next, the system can apply the etiquette rule to a series of violations stored in the database to determine whether to send a notification or whether to terminate the process (step 608).

Specifically, the system can keep track of the number of violations that a particular process has committed, and perform different corrective actions based on the number of violations. For example, the system may send a notification each time a process violates a resource-usage rule. However, if a process violates a rule more than a specified number of times, the system can terminate the process or escalate the issue by sending an email to the process owner's manager or to the system administrator.

Figure 7:
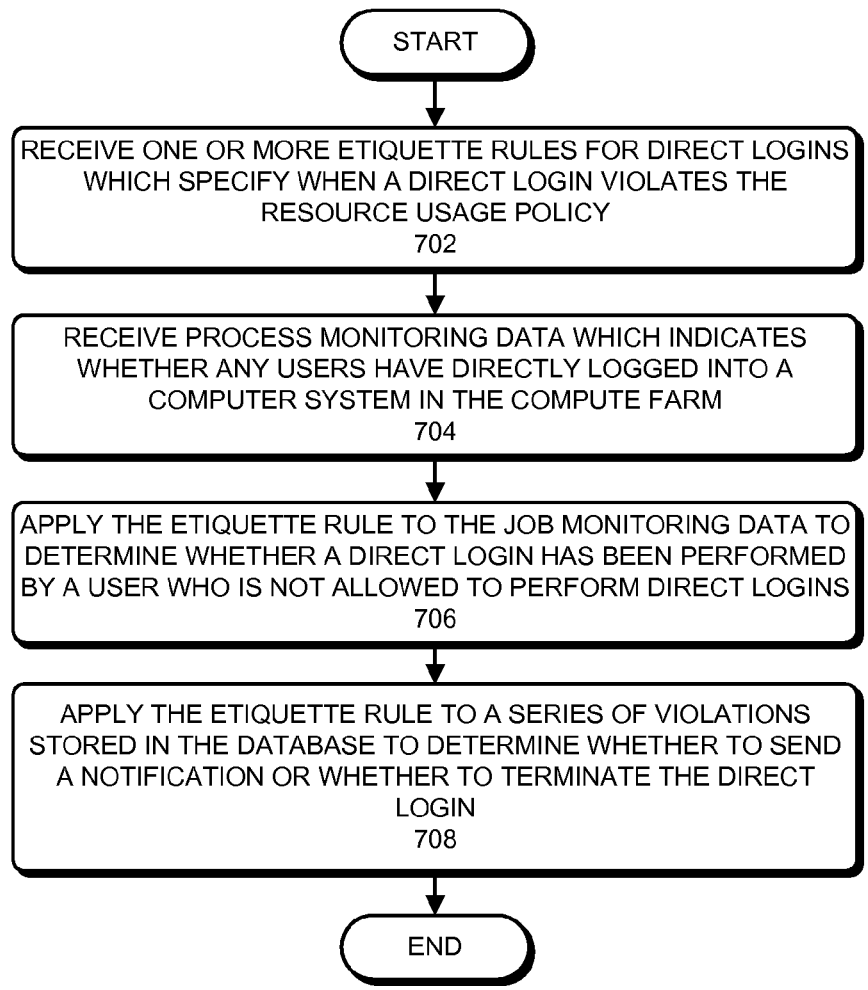
FIG. 7 presents a flowchart that illustrates a process for applying etiquette rules to direct logins in accordance with an embodiment of the present invention.

FIG. 7 presents a flowchart that illustrates a process for applying etiquette rules to direct logins in accordance with an embodiment of the present invention.

The process can begin by receiving one or more etiquette rules for direct logins which specify when a direct login violates the resource-usage policy (step 702). For example, an etiquette rule may specify that all direct logins by normal users (as opposed to administrators) violate the policy. Specifically, the etiquette rule may be implemented using an exclude list. The system may determine that all direct logins to a computer system in the compute farm violate the resource-usage policy unless the login user name or the computer system is on an exclude list. The exclude list can enable the system to allow direct logins by system administrators who have a legitimate reason for directly logging into a computer system in the compute farm. Further, the exclude list can exclude certain computer systems in the compute farm which have been specifically reserved for certain users to perform direct logins.

Next, the system can receive process monitoring data which indicates whether any users have directly logged into a computer system in the compute farm (step 704).

The system can then apply the etiquette rule to the job monitoring data to determine whether a direct login has been performed by a user who is not allowed to perform direct logins (step 706). If the user has directly logged into a computer system in violation of the resource-usage policy, the system can store the violation in a violation database.

Next, the system can apply the etiquette rule to a series of violations stored in the database to determine whether to send a notification or whether to terminate the direct login (step 708).

For example, the system may send a notification to a user who directly logged into a computer system, and if the user does not log out within a specified amount of time, the system can terminate the session. Further, the system may determine the list of processes which were spawned by the user when the user was logged in, and terminate those processes as well.

Figure 8:
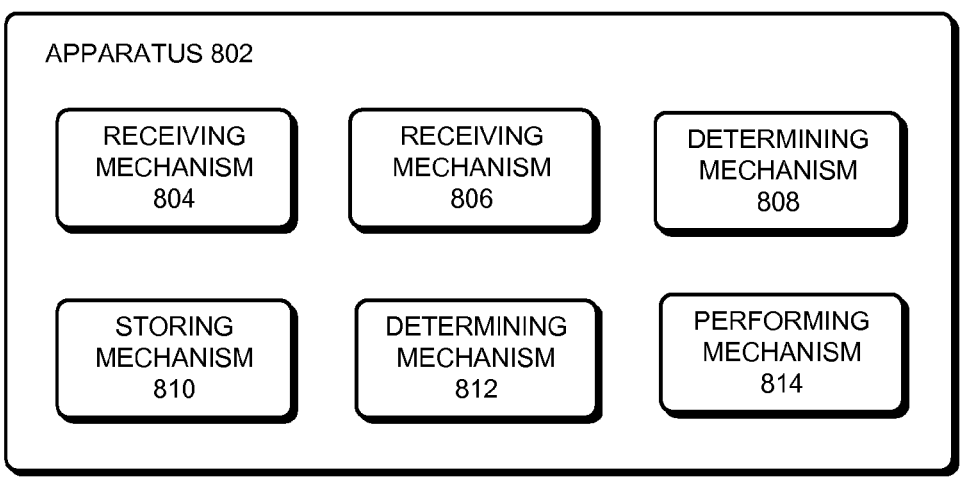
FIG. 8 illustrates an apparatus to enforce a resource-usage policy in a compute farm in accordance with an embodiment of the present invention.

FIG. 8 illustrates an apparatus to enforce a resource-usage policy in a compute farm in accordance with an embodiment of the present invention.

Apparatus 802 can comprise a number of mechanisms which may communicate with one another via a wire or wireless communication channel.

Apparatus 802 may be realized using one or more integrated circuits, and it may be integrated in a computer system, or it may be realized as a separate device which is capable of communicating with other computer systems. Specifically, apparatus 802 can comprise receiving mechanism 804, receiving mechanism 806, determining mechanism 808, storing mechanism 810, determining mechanism 812, and performing mechanism 814.

In some embodiments, receiving mechanism 804 may be configured to receive etiquette rules, receiving mechanism 806 may be configured to receive resource-usage information, determining mechanism 808 may be configured to determine a resource-usage violation by applying the resource-usage rules to the resource-usage information, storing mechanism 810 may be configured to store the resource-usage violation in a violation database, determining mechanism 812 may be configured to determine a corrective action by applying corrective-action rules to a series of violations stored in the violation database, and performing mechanism 814 may be configured to perform the corrective action, thereby enforcing the resource-usage policy in the compute farm.

The foregoing description is not intended to be exhaustive or to limit the apparatus to the forms disclosed. Accordingly, many modifications and variations will be apparent to practitioners skilled in the art. For example, in some embodiments, apparatus may not include receiving mechanism 806 and determining mechanism 812. Instead, receiving mechanism 804 may be configured to receive etiquette rules as well as resource-usage information, and determining mechanism 808 may be configured to determine resource-usage violations as well as corrective actions.

CONCLUSION

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for enforcing a resource-usage policy in a compute farm, wherein the compute farm's resources are represented using a set of job slots, and wherein the set of job slots are managed by a queuing system, the method comprising:

receiving etiquette rules which include:
resource-usage rules which specify situations in which the resource-usage policy is violated, and
corrective-action rules which specify situations in which a corrective action needs to be performed;

receiving resource-usage information which includes:
job monitoring data, which describes resource usage of monitored jobs, wherein each job is associated with multiple processes which perform a task, wherein for each monitored job, the job monitoring data specifies how long the monitored job has been executing, and how long the monitored job has been idle, and
process monitoring data, which describes resource usage of monitored processes, wherein the process monitoring data indicates whether a monitored process is associated with a direct login by a user;

determining a resource-usage violation by applying the resource-usage rules to the resource-usage information;

storing the resource-usage violation in a violation database;

determining a corrective action by applying corrective-action rules to a series of violations stored in the violation database; and performing the corrective action, thereby enforcing the resource-usage policy in the compute farm, wherein performing the corrective action includes delaying the performance of the corrective action so that the corrective action is performed during a working day.

2. The method of claim 1, wherein for each monitored process, the process monitoring data includes:

an amount of processor time that the monitored process used; and an amount of memory that the monitored process used.

3. The method of claim 1, wherein the corrective action includes one of:

sending a notification to a user who caused the series of violations which triggered the corrective action;

sending a notification to the user's manager; and sending a notification to a system administrator of the compute farm.

4. The method of claim 1, wherein the corrective action includes terminating an offending job or an offending process which caused the series of violations which triggered the corrective action.

5. A computer-readable storage medium storing instructions that when executed by a computer cause the computer to perform a method for enforcing a resource-usage policy in a compute farm, wherein the compute farm's resources are represented using a set of job slots, and wherein the set of job slots are managed by a queuing system, the method comprising:

receiving etiquette rules which include:

resource-usage rules which specify situations in which the resource-usage policy is violated, and corrective-action rules which specify situations in which a corrective action needs to be performed;

receiving resource-usage information which includes:

job monitoring data, which describes resource usage of monitored jobs, wherein each job is associated with multiple processes which perform a task, wherein for each monitored job, the job monitoring data specifies how long the monitored job has been executing, and how long the monitored job has been idle, and process monitoring data, which describes resource usage of monitored processes, wherein the process monitoring data indicates whether a monitored process is associated with a direct login by a user;

determining a resource-usage violation by applying the resource-usage rules to the resource-usage information;

storing the resource-usage violation in a violation database;

determining a corrective action by applying corrective-action rules to a series of violations stored in the violation database; and performing the corrective action, thereby enforcing the resource-usage policy in the compute farm, wherein performing the corrective action includes delaying the performance of the corrective action so that the corrective action is performed during a working day.

6. The computer-readable storage medium of claim 5, wherein for each monitored process, the process monitoring data includes:

an amount of processor time that the monitored process used; and an amount of memory that the monitored process used.

7. The computer-readable storage medium of claim 5, wherein the corrective action includes one of:

sending a notification to a user who caused the series of violations which triggered the corrective action;

sending a notification to the user's manager; and sending a notification to a system administrator of the compute farm.

8. The computer-readable storage medium of claim 5, wherein the corrective action includes terminating an offending job or an offending process which caused the series of violations which triggered the corrective action.

9. An apparatus for enforcing a resource-usage policy in a compute farm, wherein the compute farm's resources are represented using a set of job slots, and wherein the set of job slots are managed by a queuing system, the apparatus comprising:

a first receiving mechanism configured to receive etiquette rules which include:

resource-usage rules which specify situations in which the resource-usage policy is violated, and corrective-action rules which specify situations in which a corrective action needs to be performed;

a second receiving mechanism configured to receive resource-usage information which includes:

job monitoring data, which describes resource usage of monitored jobs, wherein each job is associated with multiple processes which perform a task, wherein for each monitored job, the job monitoring data specifies how long the monitored job has been executing, and how long the monitored job has been idle, and process monitoring data, which describes resource usage of monitored processes, wherein the process monitoring data indicates whether a monitored process is associated with a direct login by a user;

a first determining mechanism configured to determine a resource-usage violation by applying the resource-usage rules to the resource-usage information;

a storing mechanism configured to store the resource-usage violation in a violation database;

a second determining mechanism configured to determine a corrective action by applying corrective-action rules to a series of violations stored in the violation database; and a performing mechanism configured to perform the corrective action, thereby enforcing the resource-usage policy in the compute farm, wherein performing the corrective action includes delaying the performance of the corrective action so that the corrective action is performed during a working day.

10. The apparatus of claim 9, wherein for each monitored process, the process monitoring data includes an amount of processor time that the monitored process used, and an amount of memory that the monitored process used.

11. The apparatus of claim 9, wherein the corrective action includes one of:

sending a notification to a user who caused the series of violations which triggered the corrective action;

sending a notification to the user's manager; and sending a notification to a system administrator of the compute farm.

12. The apparatus of claim 9, wherein the corrective action includes terminating an offending job or an offending process which caused the series of violations which triggered the corrective action.

* * * * *